United States Patent [19]

McGee et al.

[11] Patent Number: 5,486,426
[45] Date of Patent: Jan. 23, 1996

[54] COLD SEALABLE COHESIVE POLYMER COATED POLYOLEFIN SUBSTRATE

[75] Inventors: Dennis E. McGee, Penfield; Robert E. Touhsaent, Fairport, both of N.Y.

[73] Assignee: Mobil Oil Corporation, Fairfax, Va.

[21] Appl. No.: 345,085

[22] Filed: Nov. 28, 1994

Related U.S. Application Data

[63] Continuation-in-part of Ser. No. 131,500, Oct. 4, 1993.

[51] Int. Cl.$^6$ .................... B32B 27/08; B32B 7/10
[52] U.S. Cl. ............... 428/516; 428/343; 428/354; 428/355; 428/414; 428/502; 428/523
[58] Field of Search .................... 428/343, 354, 428/355, 414, 502, 523, 516

[56] References Cited

U.S. PATENT DOCUMENTS

| | | | |
|---|---|---|---|
| 2,795,564 | 6/1957 | Conn et al. | 526/318.2 |
| 4,000,359 | 12/1976 | Watts et al. | 526/329.1 |
| 4,058,645 | 11/1977 | Steiner | 428/331 |
| 4,403,464 | 9/1983 | Duncan | 428/349 |
| 4,500,683 | 2/1985 | Hori et al. | 524/533 |
| 4,629,657 | 12/1986 | Gulatti et al. | 428/461 |
| 4,749,616 | 6/1988 | Liu et al. | 428/331 |
| 4,898,787 | 2/1990 | Min et al. | 428/480 |
| 5,382,473 | 1/1995 | Musclow et al. | 428/414 |

FOREIGN PATENT DOCUMENTS

| | | |
|---|---|---|
| 146604 | 2/1981 | Germany. |
| 4341815.5 | 12/1993 | Germany. |

*Primary Examiner*—Tae H. Yoon
*Attorney, Agent, or Firm*—Alexander J. McKillop; Malcolm D. Keen; Jessica M. Sinnott

[57] ABSTRACT

A cold sealable emulsion-polymerized polymer cohesive formulation for coating a polyolefin film, preferably polypropylene, which has low surface tack characteristics and low blocking tendencies to an acrylic-based formulation prepared from the emulsion polymerization of acrylonitrile and one or more of a first soft monomer and a second functional monomer. A first soft monomer is any one of ethyl acrylate, hexyl acrylate, iso-octyl acrylate, butyl acrylate, isobutyl acrylate, methyl acrylate, 1,3-butadiene, vinylacetate and vinylidene chloride, and a second monomer is any one of methacrylic acid, acrylic acid, itaconic acid, crotonic acid, sulfoethyl methacrylate and maleic acid. The monomers are combined in weight percent amounts sufficient to achieve a glass transition temperature of at least about $-35°$ C.

13 Claims, No Drawings

COLD SEALABLE COHESIVE POLYMER COATED POLYOLEFIN SUBSTRATE

CROSS REFERENCE TO RELATED APPLICATIONS

This application is a continuation-in-part of application Ser. No. 08/131,500, filed Oct. 4, 1993 now abandoned.

FIELD OF THE INVENTION

This invention relates to a cold sealable emulsion polymerized cohesive composition which is low in surface tack.

BACKGROUND OF THE RELATED ART

In the past, in the preparation of films useful for packaging purposes, heat sealable coatings, such as acrylic coatings, were coated on one side of the film substrate and another heat sealable coating, such as polyvinylidene chloride (PVDC) was coated on the other side. The acrylic coated side was generally the outside of the film, the side in direct contact with the hot sealer surfaces, where good hot slip and jaw release characteristics are required. The PVDC coating was usually on the inside of the film and provided the high seal strength, good hot tack characteristics and barrier properties required for such packaging. These heat sealable coatings have glass transition temperatures ("Tg"s) which are higher than room temperature. Such a coated film is disclosed in U.S. Pat. No. 4,403,464.

Similarly, U.S. Pat. No. 4,456,741 discloses heat sealable terpolymer compositions useful as pressure-sensitive adhesives for use with, for example, backing materials including paper, polyester film and foamed polymers. The terpolymer heat sealable pressure-sensitive adhesive composition comprises butyl acrylate, N-vinyl-2-pyrrolidinone and styrene. Other heat sealable coatings are disclosed in U.S. Pat. No. 3,696,082; and East German Patent No. DD-146,604.

In packaging products which are sensitive to heat, such as candies, chocolates, ice cream and the like, in plastic film or paper packages, the use of heated elements must be avoided in order to prevent melting of the products. Therefore, the use of heat sealable coatings to package heat sensitive products has presented serious difficulties often requiring isolation of the product from the heated elements. Cold sealable pressure-sensitive adhesives were developed which did not require the use of a heated element to seal the packages. However, these adhesives had high surface tack characteristics which made them adhere to uncoated surfaces of the packaging film, making these adhesives difficult to use due to the resulting blocking (i.e. sticking) of the film.

Findley 207-939, a polyisoprene adhesive manufactured by Findley Adhesive, Inc., is a cold sealable pressure-sensitive adhesive coating which exhibits good crimp seal strength on oriented polypropylene film and has a Tg of −1.6° C. This adhesive has a high surface tack which often results in blocking of the packaging film.

Another such pressure-sensitive adhesive composition is disclosed in U.S. Pat. No. 4,500,683 (Hori et al.). The pressure sensitive adhesives of this patent contain as a polymer component an addition polymerization polymer of an acrylate or methacrylate polymer and one or more ethylenically unsaturated monomers, such as acrylonitrile, capable of forming homo- or copolymers having a glass transition temperature of at least 273° k. The composition is made by solution polymerization or bulk polymerization. This composition forms a viscous adhesive composition which is tacky at room temperature, thus presenting the blocking problems when used on packaging films.

Various other pressure sensitive films have been disclosed. U.S. Pat. No. 2,795,564 (Conn et al.) discloses quick tack adhesive films made by emulsion polymerization of a soft-polymer- forming monomer of alkylacrylate, an α, B-unsaturated monovinylidene carboxylic acid and a hard-polymer-forming monomer such as acrylonitrile.

Similar emulsion polymers have been described for different uses in U.S. Pat. No. Re 24,906; (Ulrich) and in U.K. Patent No. 1,003,318 (Smith et al.).

U.S. Pat. No. Re 24,906 discloses a pressure sensitive adhesive which adheres to paper and is cohesive. This composition may have high blocking properties since a low adhesion liner or coating is suggested for purposes of protecting the adhesive surface from forming a permanent bond.

U.K. Patent No. 1,003,318 discloses an alkali-soluble emulsion polymerized copolymer as an adhesive surface coating.

Acrylic-based formulations are used as protective outside coatings for packaging films used in wrapping products. These acrylic-based coatings improve machineability, printability and flavor and aroma protection. However, the known low blocking pressure sealable coatings such as those described in U.S. Pat. No. 5,070,164 (Min et al.) tend to block (stick) to acrylic-based formulations. This blocking causes serious difficulties during packaging and material handling.

Thus, the related art has disclosed heat sealable coatings and pressure-sensitive, cold sealable adhesives useful in the packaging art. The related art has not, however, disclosed a cold sealable, pressure-sensitive cohesive formulation, which is cohesive only when placed under pressure in contact with other cold sealable cohesive coated surfaces and does not block to acrylic-based outside formulations.

SUMMARY OF THE INVENTION

An object of the present invention is to provide a cold sealable cohesive formulation having the unique improved combination of properties, e.g., low surface tack to acrylic-based coatings, good coating uniformity, good seal strength and wetting ability, on substrates such as plastic and paper film.

A further object of the invention is to provide a cold sealable, emulsion polymer cohesive formulation which, when coated on a first side of a film or paper substrate coated on a second side with an acrylic-based formulation, imparts high cold seal strength, i.e., bonding under only pressure, and improved surface properties, e.g., low surface tack to the acrylic-based coating.

Another object of the present invention is to provide improved packaging film or paper coated with a cold sealable cohesive formulation having a smooth, non-tacky surface which will not block at room temperature.

Another object of the invention is to provide improved coated packaging film having good cold seal strength.

These and other objects are achieved according to the present invention by providing an emulsion polymerized, cold sealable, cohesive composition prepared from the emulsion polymerization of an ethyleneically unsaturated nitrile and one or more monomers selected from group (a) and group (b). The group (a) monomer is a soft monomer.

The soft monomer is selected from the group consisting of ethyl acrylate, hexyl acrylate, iso-octyl acrylate (such as 2-ethylhexyl acrylate), butyl acrylate, isobutyl acrylate, methyl acrylate, vinylidene chloride, 1,3-butadiene, vinyl acetate and mixtures thereof. The group (b) monomer is a functional monomer. The functional monomer is characterized by a reactive group, such as an acidic group. The functional monomer is selected from the group consisting of methacrylic acid, acrylic acid, itaconic acid, crotonic acid, sulfoethyl methacrylate, maleic acid and mixtures thereof.

The resulting latex formulation adheres to packaging film substrates, such as polyolefin films, specifically, oriented polypropylene ("OPP") or paper and other films. The coated surface is cohesive at room temperature and under pressure to other similarly coated surfaces and exhibits low blocking tendencies to acrylic-based formulations. The coated surface presents a smooth, non-tacky surface.

The invention is directed to a pressure sealable emulsion polymerized cohesive polymer which has low blocking tendencies to an acrylic-based formulation, comprising: an acrylonitrile monomer and one or more of:

(a) a soft monomer selected from the group consisting of methyl acrylate, ethyl acrylate, hexyl acrylate, iso-octyl acrylate, butyl acrylate, isobutyl acrylate, isopropyl acrylate, vinylidene chloride, 1,3 butadiene and vinylacetate; and (b) a monomer selected from the group consisting of acrylic acid, methacrylic acid, itaconic acid, crotonic acid, sulfoethyl methacrylate and maleic acid; the monomers being combined in weight percent amounts based on the total weight of the monomer sufficient to achieve a glass transition temperature ranging from at least about $-35°$ C., typically about $-30°$ C. to about $15°$ C., the polmer having low tack characteristics and cohesiveness to similarly coated substrates when cold sealed under pressure.

DETAILED DESCRIPTION OF THE INVENTION

The emulsion polymerized cold sealable polymer formulations of the present invention are, typically, prepared by an emulsion polymerization process. The polymerization is carried out in the presence of water, an emulsifying agent and a free radical catalyst. Typical free radical catalysts include hydrogen peroxide, ammonium or potassium persulfate or a redox type, such as mixtures of persulfates with alkali metal bisulfites, thiosulfates or hydrosulfites. Generally, the total amount of catalyst employed is in the range of from about 0.1% by weight to about 2% by weight based on the total weight of the monomer. The emulsion polymerization is typically carried out in the presence of one or more anionic, nonionic or cationic emulsifiers such as, for example, the alkyl carboxylic acid salts, phosphoric acid salts, the alkyl sulfate salts, the alkyl sulfonate salts, the alkyl aryl ether alcohols and the alkyl aryl polyether sulfate salts. Generally, the total amount of emulsifier employed is from about 0.01 to about 2.0 percent by weight based on the total amount of water.

A chain transfer agent, such as, isooctyl thioglycolate, thioglycerol or dodecylmercaptan can be employed in the emulsion polymerization process. Usual amounts range from about 0.1 to 5% by weight based on the weight of total monomer.

The polymerization can be conducted in a redox system or in a higher temperature thermal process using a persulfate-type initiator or an azobis isobutrylnitrile initiator.

In general the polymerization is carried out at a temperature of from about $40°$ C. to about $100°$ C., preferably about $60°$ C. to about $80°$ C., at a pressure in the range of from about 0 to about 30 psig. A thermal polymerization is carried out at the higher range of these temperatures typically above about $70°$ C. The reaction can be conducted in glassware with a reflux condenser. This stage is usually carried out in the presence of an inert gas, such as nitrogen. The polymerization is generally carried out for a time of from about 1 to about 8 hours, preferably about 3 to 4 hours. After completion of the polymerization reaction, the pH of the polymer can be adjusted to up to 10, more specifically, from about 6 to about 10.

A two-stage polymerization process is also contemplated, generally the second stage polymerization is performed under the same temperature and pressure conditions as in the first stage. A preformed seed latex is made to which up to about 95% of the remaining amount of monomer feed is gradually fed in a second stage over a period of from about 2 to about 5 hours. The total reaction time of the second stage will usually range from about 4 to about 6 hours.

In one embodiment of the invention there is a two-stage polymerization in which the seed, or core, latex comprises up to about 50 wt. % of a different polymer such as a polymer described in U.S. Pat. No. 5,070,164. To this is added, as the remaining monomer feed, a monomer feed of this invention.

In accordance with the present invention, the polymers prepared from the above described emulsion polymerization process are prepared from a monomer feed comprised of an ethyleneically unsaturated nitrile specifically any acrylonitrile, even more specifically, a first monomer selected from the group consisting of acrylonitrile and methacrylonitrile, a second soft monomer selected from the group consisting of ethyl acrylate, hexyl acrylate, iso-octyl acrylate, butyl acrylate, methyl acrylate, isobutyl acrylate, 1,3-butadiene, vinyl acetate and vinylidene chloride; and, a third functional monomer selected from the group consisting of methacrylic acid, acrylic acid, itaconic acid, crotonic acid, sulfoethyl methacrylate, and maleic acid. Usually, one monomer is selected from each group to produce a terpolymer.

The glass transition temperature of acrylonitrile is about $97°$ C. The glass transition temperature of homopolymers from the second and third monomeric groups are listed in Table 1.

TABLE 1

|  | Homopolymer Tg's Tg (°C.) |
| --- | --- |
| Second Monomer Group; |  |
| Ethyl acrylate | −22 |
| Hexyl acrylate | −57 |
| Isopropyl acrylate | −3 |
| Iso-octyl acrylate | −50.15 |
| Butyl acrylate | −54 |
| Methyl acrylate | 8 |
| Vinylidene chloride | −17 |
| Isobutyl acrylate | −43 |
| 1,3-Butadiene | −78 |
| Vinylacetate | −32 |
| Third Monomer Group; |  |
| Acrylic acid | 106 |
| Methacrylic acid | 185 |
| Itaconic acid | — |
| Sulfoethyl methacrylate | — |
| Maleic acid | — |
| Crotonic acid | — |

In general, the amounts of each monomer of the present invention will depend on the preferred glass transition temperature of the final formulation. Typically, the polymer will contain about 10 to 65 wt. % of acrylonitrile, about 30 to 85 wt. % of the second monomer group, and about 0.5 to 5 wt. %, preferably about 1 to 3 wt. %, even more preferably 1 to 2 wt. %, of the third monomer group.

A crosslinking agent may be useful. Low levels, usually less than 5 wt. %, of a crosslinking agent, such as divinylbenzene or 1,3-butylene glycol dimethacrylate or any other crosslinking agent known in the art, may also be employed, but are not required. It was found that the effect of the chain transfer agent, typically iso-octyl thioglycolate, to lower the molecular weight could be balanced by the effect of the crosslinking agent to increase the molecular weight; therefore, when higher levels of crosslinking agent are used, higher levels of the chain transfer agent are usually used and vice versa. This helps to balance the properties of cohesive strength and sealability.

The emulsion polymers of the present invention have a weight average molecular weight ranging to about 150,000, preferably from about 50,000 to about 90,000 as determined by gel permeation chromatography (GPC). The polymer has a calculated glass transition temperature (Tg) of from at least about −35° C., usually about −30° C. to about 15° C. We found that lower glass transition temperatures, typically less than 3° C., more typically less than 0° C. and even more typically about −5° C., exhibit better pressure sealable properties, but this can vary depending upon the comonomers used. The diameter of the polymer particles are generally in the range of from about 0.05 to about 0.3 microns.

The glass transition temperature ("Tg") of the polymer formulation is inversely related to the pressure sealability of the coating. So that when the Tg of the polymer decreases, the pressure sealability increases. Tg of the polymer is related to the ratios of the weight fractions of the monomeric components and the Tg's of these components, so that when a terpolymer made from three monomers is being analyzed, $$\frac{1}{T_g} = \frac{W_{f1}}{T_{g1}} + \frac{W_{f2}}{T_{g2}} + \frac{W_{f3}}{T_{g3}}$$

where:
$T_g$=the Tg of the terpolymer;
$T_{g1}$=the Tg of the first monomer;
$T_{g2}$=the Tg of the second monomer;
$T_{g3}$=the Tg of the third monomer;
$W_{f1}$=the weight fraction of the first monomer;
$W_{f2}$=the weight fraction of the second monomer; and
$W_{f3}$=the weight fraction of the third monomer.

After drying, the resulting latex formulation adheres to the packaging film substrates even after exposure to moisture. That is, they retain a significant amount of their original bond strength even after immersion in water. Once solidified by drying, the coated surface does not adhere to non-treated, uncoated film surfaces such as untreated polypropylene or acrylic-based surface coatings.

The low adhesion to acrylic-based coatings is an important feature of the invention because these coatings impart the combined properties of machineability and printability to untreated and release-treated polypropylene. The untreated and release-treated polypropylene, while being machineable, is not printable. The latex coating presents a smooth, non-tacky surface which will not block to acrylic-based surface coatings under normal operating conditions. However, if similarly coated surfaces are placed in contact with each other and under pressure, and elevated temperatures, usually up to about 150° F., (65.6° C.) room temperature or even below room temperatures, usually about 60° F., (15.6° C.), then the coated surfaces become cohesive forming a strong bond between each other. With certain polymers, the bond created has been found to be stronger than the film itself. The seal temperature required can be effected by the thickness of the composition on the substrate; that is, thicker substrates can require higher temperatures for pressure sealability.

Thus, the emulsion polymer formulations of the present invention are very useful in imparting high cold seal bond strength to packaging film substrates, particularly polyolefin film, such as polypropylene film substrates. Substrates which are particularly contemplated for use with the cold sealable polymer formulations of the present invention include cast or oriented polypropylene, coextruded films, nylon, white opaque film, such as film made from opaque oriented polypropylene containing a strata of voids formed by void-initiating particles such as polybutylene-terephthalate as descirbed in U.S. Pat. No. 4,377,616, cellophane, paper, polyesters, high density polyethylene and linear low density polyethylene. When a polypropylene film is employed, the sheet is usually about 20 to 40, specifically about 30 to 35 microns in thickness.

In one specific aspect of this invention the film substrate is primed with a material that helps to anchor the topcoat. Typical primers include epoxy-type primers such as a polystyrene latex which contains at least one epoxy functionality, melamine formaldehyde or polyethyleneimine.

The polymeric portion of the contemplated acrylic based coatings should contain at least about 80 wt. % acrylic, preferably greater than 90 wt. % acrylic. Small amounts of other materials such as acrylonitrile and ethylene acrylic acid can also be present in the acrylic-based polymer, typically less than about 10 wt. %. The amount of non-acrylic materials should be limited as they can cause blocking. The acrylic-based coating can be formulated with particulates such as polyethylene, silicon and silicone, silica, talc, or other particles ranging in size from 0.5 to 10.0 microns, specifically about 6 to 9 microns, depending upon whether the final film product is opaque or transparent. For opaque films the particulates are about 8 microns; for transparent films, particulates are less than 8 microns. The size of the particulates can be important for purposes of blocking and machineability as well as storage stability of the coating formulation because larger particles tend to settle out of the formulation. The solid particulates loading is usually less than 15% solids, based on the total weight of the coating. Preferably, the solids concentration is less than 10% solids.

Commonly known techniques can be employed to apply the emulsion polymer formulation of the present invention to the film or paper substrate. For example, when impregnating or saturating the substrate, it may be dipped or sprayed. If the substrate is coated, this may be accomplished by dipping, spraying or by employing a roller, spreading knife, brush or the like. Generally, for the best crimp sealability, the emulsion polymer formulation should be applied at a low level, typically, applied in an amount of from about 0.5 to 5 g/1000 sq. in., preferably about 1 to 1.5 g/1000 sq. in. to the film substrate.

The emulsion polymerization formulation of the present invention may be compounded with, or have mixed therein, other known ingredients or stabilizers, antifoaming agents, dying adjuvants, pigments, waxes, corn starch, silica, talc and the like or other compounding aids to control surface tack and other surface properties. Thickeners or bodying agents may be added to the polymers so as to control the viscosity of the polymer and thereby achieve the proper flow properties for the particular application desired.

The following examples are illustrative of the invention.

EXAMPLE 1

This example illustrates the preparation of an emulsion polymerized, cold sealable, terpolymer formulation within the scope of the invention.

Using a semi-continuous batch process, a latex was prepared by continuously adding and metering 404 g. of the total monomer feed over a period of 2.5 hours to a reactor containing 475 g of water, 1 g of 30% sodium lauryl sulfate, as an emulsifier, and 1.6 g 70% tert-butyl hydroperoxide as free-radical catalyst. The premixed total monomer feed is comprised of 80.2 wt. % ethyl acrylate, 15.8 wt. % acrylonitrile, 3 wt. % methacrylic acid, and 1 wt. % isoctyl thioglycolate (as a chain transfer agent), based on the total monomer feed. A feed containing 7 g of 30% sodium lauryl sulfate, 0.7 g of sodium formaldehyde sulfoxolate (as a catalyst activator) and 45 g water was added over a three hour period. The emulsion polymerization reaction was maintained at 60° C. to 70° C. and the reaction was performed in an atmospheric pressure reactor equipped with a reflux condenser and in the presence of inert nitrogen gas. Sufficient agitation was used to uniformly disperse the monomers in the reactor. The reactor batch was held for about 1 hour after the addition of all the feeds.

The latex was subsequently cooled and filtered through a 200 mesh screen. The latex stability of the resultant EA/ACN/MAA terpolymer was excellent. The terpolymer has the structure:

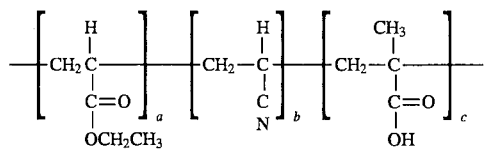

After polymerization, the terpolymer was blended with a typical combination of wax and talc.

Polymer (a:b:c=81:16:3).

EXAMPLE 2

This example illustrates the preparation of a crosslinked polymer. The procedure of this example was substantially the same as Example 1 except that it was a thermal-initiated polymerization. Using a semi-continuous batch process, a latex was prepared by continuously adding and metering 406 g of the total monomer feed over a period of 2.5 hours to a reactor containing 475 g water, 1 g of 30% sodium lauryl sulfate, as an emulsifier, and 12 g of 10% aqueous ammonium persulfate (as a free radical initiator) that was prepared immediately prior to the start of the polymerization and added to the reactor approximately two minutes prior to beginning the addition of the monomer feed. The pre-mixed total monomer feed is comprised of 79.8 wt. % ethyl acrylate, 14.8 wt. % acrylonitrile, 3 wt. % methacrylic acid, 1 wt. % divinyl benzene (80% pure), and 1.5 wt. % iso-octyl thioglycolate (as a chain-transfer agent), based on the total monomer feed. A feed containing 9 g of 23% sodium dodecyl benzene sulfonate (as a stabilizing emulsifier) and 41 g water was added over a 3-hour period. The emulsion polymerization reaction was maintained at 75° to 85° C. and the reaction was performed in the same laboratory glassware that was used in Example 1. After all feeds were in, the batch was held at 80° C. for about 1 hour at which time 17 g of 30% aqueous ammonia (diluted to 400 g with water) was added. When the temperature again reached 80° C., the batch was held an additional hour at 80° C. and then cooled and removed from the glassware.

The properties of the polymers prepared by Examples 1 and 2 are summarized in Table 2 below:

TABLE 2

| Latex | Characteristics of Polymer Latex | |
|---|---|---|
| | Example 1 | Example 2 |
| Total Solids (%) | 42.8 | 31.5 |
| Particle Size (nm) | 130 | 87 |
| pH | 6.1 | 9.5 |

EXAMPLE 3

Polymer latex formulations prepared in accordance with the emulsion polymerization processs of both Examples 1 and 2 were applied by direct gravure to the sealable portions of one side of a standard acrylic coated 92 gauge OPP film primed with polyethyleneimine (which helps to anchor the topcoat to the substrate). The other side of the film was primed with the polyethyleneimine and coated with an all-acrylic polymer formulation. The coatings were dried at a temperature of about 220° F.

The coating weights for both pressure sealable coatings were about 1.2 (±0.4) g/1000 sq. in. while the coating weight for the acrylic-based coating was about 0.6 g/1000 sq. in.

The properties of the coated films were tested and the results of the testing, in comparison with the results of testing a cold sealable terpolymer described in U.S. Pat. No. 5,070,164, made by a 1-step polymerization process, are summarized in Table 3.

TABLE 3

| | Results on Cold Seal Coatings | | | | | |
|---|---|---|---|---|---|---|
| Adhesive | Chemical Composition | Ratio | Calculated Tg (°C.) | Crimp Seal (g/in) | Block to Standard Acrylic | Surface Tack |
| One-Stage Emulsion polymerized polymer | EA/VA/MAA | 67/30/3 | −5 | 375* | BTD | low |
| Emulsion polymerized polymer of Example 1 | EA/ACN/MAA | 81/16/3 | −5 | 357 | 21 | low |

TABLE 3-continued

Results on Cold Seal Coatings

| Adhesive | Chemical Composition | Ratio | Calculated Tg (°C.) | Crimp Seal (g/in) | Block to Standard Acrylic | Surface Tack |
|---|---|---|---|---|---|---|
| Emulsion polymerized polymer of Example 2 | EA/ACN/MAA/DVB | 81/15/3/1 | −5 | 458* | 27 | low |

Base Film: Standard 92 Gauge Acrylic Coated oriented polypropylene film
Crimp: 80 psi, ½ sec., room temp.
ACN = Acrylonitrile
EA = ethyl acrylate
MMA = methyl methacrylate
MAA = methacrylic acid
BTD = block to destruction
DVB = divinylbenzene
VA = vinyl acetate
*This crimp seal was strong enough to tear the film which indicates a good seal; that is, the adhesive was stronger than the base film. In general, however, good crimp seal strength is usually over 200 g/in, typically over 300 g/in.

What is claimed is:

1. A coated polyolefin substrate which comprises a polyolefin film having a first side and a second side and a cold sealable, emulsion polymerized pressure sealable cohesive polymer composition for coating the first side of the substrate and an acrylic-based composition for coating the second side of the substrate, the polymer for coating the first side of the substrate comprising an acrylonitrile monomer and at least one of:
   (a) a soft monomer selected from the group consisting of methyl acrylate, ethyl acrylate, hexyl acrylate, iso-octyl acrylate, butyl acrylate, isobutyl acrylate, isopropyl acrylate and vinyl acetate; and
   (b) a monomer selected from the group consisting of acrylic acid, methacrylic acid, itaconic acid, crotonic acid, sulfoethyl methacrylate and maleic acid;
   the monomers being combined in weight percent amounts based on the total weight of the polymer sufficient to achieve a glass transition temperature of at least about −35° C., the weight percent amounts of the acrylonitrile monomer ranges from about 10 wt. % to about 65 wt. %, the weight percent amount of the (a) monomer ranges from about 30 wt. % to about 85 wt. % and the weight percent amount of the (b) monomer ranges from about 1 wt. % to about 3 wt. %, based on the total weight of the polymer, the polmer having low blocking tendencies to the acrylic-based formulation of the second side of the substrate.

2. The coated substrate as described in claim 1 in which the acrylic-based formulation further comprises a component selected from the group consisting of methyl acrylate, methyl methacrylate, and methacrylic acid with the provision that each of the (a) and (b) monomer is different from this component.

3. The coated substrate as described in claim 2 in which the polymeric portion of the acrylic-based formulation comprises at least about 80 wt. % acrylic, based on the total weight of the polymer.

4. The coated substrate as described in claim 1 in which the soft monomer of (a) is ethyl acrylate and the monomer of (b) is methacrylic acid.

5. The coated substrate as described in claim 1 in which the acrylonitrile monomer is an ethyleneically unsaturated nitrile.

6. The coated substrate as described in claim 5 in which the weight percent among of each monomer is sufficient to achieve a glass transition temperature ranging from about −30° C. to 15° C.

7. The coated substrate as described in claim 1 in which the substrate comprises an oriented polypropylene film.

8. The coated substrate as described in claim 1 in which the polymer for treating the first side of the substrate further comprises a crosslinking agent.

9. The coated substrate as described in claim 8 in which the crosslinking agent is divinylbenzene.

10. The coated substrate as described in claim 1 in which the first and/or second side of the substrate is coated with a primer located between the polyolefin film and the acrylic-based composition and/or the polymer.

11. The coated substrate as described in claim 10 in which the primer is an epoxy primer.

12. The coated substrate as described in claim 10 in which the primer is melamine formaldehyde or polyethyleneimine.

13. The coated substrate as described in claim 1 in which the polymer for coating the first side of the substrate further comprises particulates ranging in size from about 6 to 9 microns in a concentration which is less than about 10 wt. % based upon the entire weight of the coating.

* * * * *